United States Patent
Hao et al.

(10) Patent No.: US 12,348,610 B2
(45) Date of Patent: Jul. 1, 2025

(54) USER SECURITY IMPROVEMENT IN SATELLITE-GROUND INTEGRATED NETWORK SYSTEM

(71) Applicant: ZHEJIANG LAB, Hangzhou (CN)

(72) Inventors: Nan Hao, Hangzhou (CN); Xingming Zhang, Hangzhou (CN); Xiangming Zhu, Hangzhou (CN); Zhenting Li, Hangzhou (CN); Mengmeng Liu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/556,168

(22) PCT Filed: May 30, 2023

(86) PCT No.: PCT/CN2023/097072
§ 371 (c)(1),
(2) Date: Oct. 19, 2023

(87) PCT Pub. No.: WO2024/098730
PCT Pub. Date: May 16, 2024

(65) Prior Publication Data
US 2025/0080321 A1    Mar. 6, 2025

(30) Foreign Application Priority Data

Nov. 10, 2022    (CN) .......................... 202211402187.9

(51) Int. Cl.
*H04L 9/06*    (2006.01)
*H04L 9/32*    (2006.01)

(52) U.S. Cl.
CPC .......... *H04L 9/0618* (2013.01); *H04L 9/3247* (2013.01); *H04L 9/3263* (2013.01)

(58) Field of Classification Search
CPC ... H04L 9/0618; H04L 9/3247; H04L 9/3263; H04W 12/03; H04W 12/069; H04W 12/122
See application file for complete search history.

(56) References Cited

U.S. PATENT DOCUMENTS 6,487,294 B1 *   11/2002   Alexander ......... H04B 7/18565
                                                      713/168
7,797,543 B1 *   9/2010    Campbell ............. H04L 63/123
                                                      713/181
(Continued)

FOREIGN PATENT DOCUMENTS

CA       2986837 A1    11/2016
CN     103312691 A     9/2013
(Continued)

OTHER PUBLICATIONS

Zhao, Baokang, et al. "Toward efficient authentication for space-air-ground integrated Internet of Things." International Journal of Distributed Sensor Networks 15.7 (2019): 1550147719860390.*
(Continued)

*Primary Examiner* — Jimmy H Tran
(74) *Attorney, Agent, or Firm* — The Small Patent Law Group LLC; Christopher R. Carroll

(57) ABSTRACT

The present disclosure provides methods and apparatuses for improving user security of satellite-ground integrated network systems. On the basis of the satellite-ground integrated network pipeline only authenticates a terminal in a satellite-ground integrated network, a two-stage authentication based on CA digital certificates and user characteristic information is put forward for users and services using the terminal. The two-stage authentication includes: firstly, when a first spatio-temporal information ciphertext digest obtained from spatio-temporal information ciphertext in a service request by using a digest algorithm is consistent with a second spatio-tem-
(Continued)

poral information ciphertext digest obtained by decrypting a digital signature in the service request using a user public key, the user is legal; furthermore, when spatio-temporal information characteristics obtained by decrypting the spatio-temporal information ciphertext using a private key of the satellite-ground integrated core network are consistent with spatio-temporal characteristics in the digital certificate, the verification succeeds.

12 Claims, 3 Drawing Sheets

(56) References Cited

U.S. PATENT DOCUMENTS

| | | | | |
|---|---|---|---|---|
| 9,367,822 | B2* | 6/2016 | Shipon | G06Q 10/00 |
| 11,297,500 | B2* | 4/2022 | Jain | H04L 9/3297 |
| 11,824,882 | B2* | 11/2023 | Wentz | H04L 63/1433 |
| 2004/0072561 | A1* | 4/2004 | LaPrade | H04B 7/18582 |
| | | | | 455/430 |
| 2005/0198673 | A1* | 9/2005 | Kit | H04N 21/4181 |
| | | | | 725/63 |
| 2008/0244276 | A1* | 10/2008 | Prouff | H04L 9/3255 |
| | | | | 713/193 |
| 2009/0158032 | A1* | 6/2009 | Costa | H04L 63/0823 |
| | | | | 380/270 |
| 2009/0259840 | A1* | 10/2009 | Campbell | H04L 9/3247 |
| | | | | 713/155 |
| 2010/0037308 | A1* | 2/2010 | Lin | H04L 63/10 |
| | | | | 455/517 |
| 2011/0003544 | A1* | 1/2011 | Underwood | H04H 40/90 |
| | | | | 455/3.06 |
| 2011/0289311 | A1* | 11/2011 | Roy-Chowdhury | |
| | | | | H04L 9/0844 |
| | | | | 713/176 |
| 2013/0251150 | A1* | 9/2013 | Chassagne | H04L 63/123 |
| | | | | 380/270 |
| 2016/0147979 | A1* | 5/2016 | Kato | G06F 21/6209 |
| | | | | 713/171 |
| 2018/0103017 | A1* | 4/2018 | Wang | H04L 9/0825 |
| 2018/0241464 | A1* | 8/2018 | Michaels | H04B 7/18539 |
| 2019/0208417 | A1* | 7/2019 | Kang | H04W 12/03 |
| 2020/0028576 | A1* | 1/2020 | Haley | H04B 7/185 |
| 2020/0059786 | A1* | 2/2020 | Farag | H04L 9/3236 |
| 2020/0120202 | A1* | 4/2020 | Jakobsson | H04L 63/105 |
| 2020/0228988 | A1* | 7/2020 | Yang | H04L 63/1466 |
| 2020/0380616 | A1* | 12/2020 | King | G06Q 30/0185 |
| 2021/0051483 | A1* | 2/2021 | Soryal | B60R 25/24 |
| 2021/0204129 | A1* | 7/2021 | Yang | H04W 76/27 |
| 2021/0306213 | A1* | 9/2021 | Medvinsky | H04L 9/0827 |
| 2021/0312561 | A1* | 10/2021 | Speasl | G06F 21/602 |
| 2022/0109536 | A1* | 4/2022 | Ghozlan | H04L 5/0073 |
| 2022/0132315 | A1* | 4/2022 | Kolekar | H04W 12/106 |
| 2022/0141004 | A1* | 5/2022 | Murray | H04L 9/0861 |
| | | | | 713/171 |
| 2022/0159461 | A1* | 5/2022 | Maass | H04L 9/0894 |
| 2022/0240094 | A1* | 7/2022 | Kim | H04W 12/106 |
| 2022/0247678 | A1* | 8/2022 | Atwal | H04L 45/645 |
| 2022/0263668 | A1* | 8/2022 | Autiosalo | H04L 9/3297 |
| 2022/0272080 | A1* | 8/2022 | Sangle-Ferriere | H04L 9/3247 |
| 2022/0303779 | A1* | 9/2022 | Boyapalle | H04W 12/35 |
| 2022/0311623 | A1* | 9/2022 | Tomlinson | H04L 9/3255 |
| 2023/0054892 | A1* | 2/2023 | Yoon | H04W 8/18 |
| 2023/0188360 | A1* | 6/2023 | Park | H04L 9/3263 |
| | | | | 713/175 |
| 2023/0232220 | A1* | 7/2023 | Low | H04L 9/0662 |
| | | | | 726/2 |
| 2023/0345242 | A1* | 10/2023 | Li | H04W 12/06 |
| 2023/0422038 | A1* | 12/2023 | Kolekar | H04W 12/122 |
| 2024/0056816 | A1* | 2/2024 | Kolekar | H04W 12/03 |
| 2024/0187176 | A1* | 6/2024 | Wang | H04W 72/23 |
| 2024/0205208 | A1* | 6/2024 | Kasody | G06Q 30/0613 |
| 2024/0236698 | A1* | 7/2024 | Lanfranchi | H04W 12/069 |
| 2024/0259277 | A1* | 8/2024 | Chou | H04L 67/51 |
| 2024/0273411 | A1* | 8/2024 | Mueck | H04L 9/3263 |
| 2024/0378283 | A1* | 11/2024 | Ricket | G06Q 20/24 |
| 2025/0021673 | A1* | 1/2025 | Miyashita | G06Q 30/0185 |
| 2025/0071551 | A1* | 2/2025 | Choi | H04W 12/108 |

FOREIGN PATENT DOCUMENTS

| | | |
|---|---|---|
| CN | 109787988 A | 5/2019 |
| CN | 114025352 A | 2/2022 |
| CN | 114095931 A | 2/2022 |
| CN | 114172669 A | 3/2022 |
| CN | 115442807 A | 12/2022 |
| WO | 2016172986 A1 | 11/2016 |
| WO | 2017201753 A1 | 11/2017 |

OTHER PUBLICATIONS

Liu, Yang, Leiqing Ni, and Mugen Peng. "A secure and efficient authentication protocol for satellite-terrestrial networks." IEEE Internet of Things Journal 10.7 (2022): 5810-5822.*

Xue, Kaiping, et al. "A secure and efficient access and handover authentication protocol for Internet of Things in space information networks." IEEE Internet of Things Journal 6.3 (2019): 5485-5499.*

Guo, Hongzhi, et al. "A survey on space-air-ground-sea integrated network security in 6G." IEEE Communications Surveys & Tutorials 24.1 (2021): 53-87.*

Li, Bin, et al. "Physical-layer security in space information networks: Asurvey." IEEE Internet of things journal 7.1 (2019): 33-52.*

Shang, Bodong, Yang Yi, and Lingjia Liu. "Computing over space-air-ground integrated networks: Challenges and opportunities." IEEE network 35.4 (2021): 302-309.*

State Intellectual Property Office of the People's Republic of China, Office Action and Search Report Issued in Application No. 2022114021879, Dec. 19, 2022, 7 pages.(Submitted with Machine/Partial Translation).

ISA State Intellectual Property Office of the People's Republic of China, International Search Report Issued in Application No. PCT/CN2023/097072, Aug. 30, 2023, WIPO, 3 pages.

ISA State Intellectual Property Office of the People's Republic of China, Written Opinion of the International Searching Authority Issued in Application No. PCT/CN2023/097072, Aug. 30, 2023, WIPO, 6 pages.(Submitted with Machine/ Partial Translation).

Lu Haitao etc. "Security of 5G Network Elements and Access Control""DOI 10.12142/ZTETJ.201904004" Jul. 17, 2019, 7 pages.

* cited by examiner

USER SECURITY IMPROVEMENT IN SATELLITE-GROUND INTEGRATED NETWORK SYSTEM

CROSS-REFERENCE TO RELATED APPLICATION

The present application is a U.S. National Stage of International Application No. PCT/CN2023/097072, filed on May 30, 2023, which claims the benefit of priority to Chinese Application No. 202211402187.9, filed on Nov. 10, 2022, the contents of all of which are incorporated by reference herein in their entireties for all purposes.

TECHNICAL FIELD

The present disclosure relates to the field of communication technologies, and in particular, to user security improvement in satellite-ground integrated network systems.

BACKGROUND

At present, there is no core network side research content for non-terrestrial networks (NTNs) in wireless side satellite networking proposed by the 3GPP fifth-generation communication system (5G). Meanwhile, item 11.3, "Space-Ground Integrated 5G Network Security Scheme", of "General Technical Requirements of Space-Ground Integrated 5G Networks (draft for review)" by the China Communications Standards Association (CCSA) Space Communication Technology Working Committee (TC12 Working Group) only provides a general description of architecture and security requirements of space-ground integrated network (Space-ground integrated 5G network security should be considered from aspects of physical security, data security and network operation security, and contents can include but are not limited to terminal connection security, space-based access network connection security, space-based core network connection security, terrestrial-based access network connection security, terrestrial-based core network connection security, network function security, user data security, network physical isolation and logical isolation, network management security, network configuration security, space-ground integrated service security, etc. Technical means that can be adopted include but are not limited to network security protection technologies such as anti-destruction technologies, anti-interference technologies, secure access and secure routing technologies, secure transmission, secure storage and key management technologies for building a space-ground integrated network security architecture, and the secure operation of network systems are ensured), and there is no specific scenario or technical solution.

An existing space-ground integrated network architecture is based on 5G non-roaming architecture. Specifically, as shown in FIG. 1, a 5G terminal is connected to a 5G base station (gNodeB, gNB) through an air interface, a backhaul network of the gNB is connected to a remote 5G core network by a satellite relay via a service pipeline of a satellite core network, and then connected to a data network (DN) via a 5G data pipeline of the satellite relay. The 5G core network only provides authentication of the terminal, but has no ability to check the legitimacy of a user using the terminal. A satellite user plane only provides a pipeline relay function between the 5G gNB and the 5G core network, and cannot parse messages of a control plane (CP) or user plane (UP) from 5G users.

As shown in FIG. 2, the security scheme under the existing 5G space-ground integrated network architecture has the following problems: on one hand, illegal services in a case of the terminal theft by a pseudo user may occupy limited resources of the satellite relay pipeline; and on the other hand, a large number of invalid requests initiated by the pseudo user may further form an attack on the data network provided by a service provider.

In summary, specific solutions are urgently needed to improve the user security of 5G systems.

SUMMARY

In view of this, the present disclosure provides methods and apparatuses for improving user security of satellite-ground integrated network systems.

According to a first aspect of embodiments of the present disclosure, a method for improving user security of a satellite-ground integrated network system is provided, including: bonding, by a user and a satellite-ground integrated core network, own characteristic information to a certificate authority (CA) respectively, to obtain digital certificates, where the characteristic information includes one or more spatio-temporal characteristics and one or more service characteristics of the user; initiating, by the user through a terminal of a satellite-ground integrated network system, a service request to the satellite-ground integrated core network through a terminal of a satellite-ground integrated network system; determining, by the satellite-ground integrated core network, whether to trigger a legitimacy verification for the user after receiving the service request; in a case of determining not to trigger the legitimacy verification for the user, directly releasing, by the satellite-ground integrated core network, a service flow of the user; and in a case of determining to trigger the legitimacy verification for the user: calculating, by the satellite-ground integrated core network, spatio-temporal information ciphertext in the received service request through a digest algorithm to obtain a first spatio-temporal information ciphertext digest; decrypting, by the satellite-ground integrated core network, a digital signature in the received service request using a public key of the user to obtain a second spatio-temporal information ciphertext digest; comparing, by the satellite-ground integrated core network, the first spatio-temporal information ciphertext digest with the second spatio-temporal information ciphertext digest; if the first spatio-temporal information ciphertext digest is consistent with the second spatio-temporal information ciphertext digest, determining, by the satellite-ground integrated core network, the user being legal, and decrypting the spatio-temporal information ciphertext using a private key of the satellite-ground integrated core network to obtain spatio-temporal information characteristics; verifying the obtained spatio-temporal information characteristics; if the verification is passed, opening a service pipeline for the user; and if the verification fails, closing the service pipeline of the user; if the first spatio-temporal information ciphertext digest is not consistent with the second spatio-temporal information ciphertext digest, determining, by the satellite-ground integrated core network, the user being illegal, and intercepting the user and a service.

In some examples, bonding, by the user and the satellite-ground integrated core network, own characteristic information to the CA respectively, including: subscribing, by the user, with the satellite-ground integrated core network, and meanwhile subscribing the characteristic information of the user; sending, by the satellite-ground integrated core network, the characteristic information of the user and characteristic information of a network element deployed with verification function together to the CA; generating, by the CA, a public key and a private key for the user and a public key and a private key for the satellite-ground integrated core network, adding the characteristic information of the user and the satellite-ground integrated core network into a corresponding digital certificate, and returning the digital certificate to the satellite-ground integrated core network; issuing, by the satellite-ground integrated core network, a digital certificate belonging to the user to the user; loading, by the network element of the satellite-ground integrated core network deployed with the verification function for the user's characteristic information, the digital certificate corresponding to the core network element.

In some examples, initiating, by the user through the terminal of the satellite-ground integrated network system, the service request to the satellite-ground integrated core network, including: encrypting, by the user, the spatio-temporal information characteristics using a public key of the satellite-ground integrated core network in the digital certificate to obtain the spatio-temporal information ciphertext; calculating, by the user, the spatio-temporal information ciphertext through the digest algorithm to obtain a spatio-temporal information ciphertext digest; encrypting, by the user, the spatio-temporal information ciphertext digest using a private key of the user to obtain the digital signature; packaging, by the user, the digital signature and the spatio-temporal information ciphertext into the service request, and sending the service request to the satellite-ground integrated core network In some examples, the spatio-temporal characteristics include any one or more of: usage time, a location, speed, tracking area information, a base station access angle, and a specific base station.

In some examples, the service characteristics include any one or more of: traffic, service server name, server address, usage habit characteristics, quality of service (Qos), a service duration, a service message type, and a service load type.

In some examples, a condition for determining to trigger the legitimacy verification for the user is the received service request is a first service initiation by the user currently using the terminal of the satellite-ground integrated network system.

In some examples, a condition for determining to trigger the legitimacy verification for the user is the received service request is a specific service of the user, and the specific service is to trigger an authentication process for identity and the characteristic information of the user.

In some examples, a condition for determining to trigger the legitimacy verification for the user is timing triggered by a configured timer.

In some examples, verifying the obtained spatio-temporal information characteristics, including: if the obtained spatio-temporal information characteristics are consistent with the spatio-temporal information characteristics in the digital certificate, determining that the verification is passed; or if the obtained spatio-temporal information characteristics are not consistent with the spatio-temporal information characteristics in the digital certificate, determining that the verification is failed.

In some examples, where the satellite-ground integrated network system is any one of: a 4G network architecture; a 5G network architecture; or a network architecture that integrates 4G and 5G.

According to a second aspect of embodiments of the present disclosure, an apparatus for improving user security of a satellite-ground integrated network system is provided, including a memory and one or more processors, where the memory is stored with executable code, and when the one or more processors executes the executable code, the method of improving user security of the satellite-ground integrated network system as mentioned above is implemented.

According to a third aspect of embodiments of the present disclosure, a non-transitory computer-readable storage medium is provided, on which a computer program is stored, which, when executed by a processor, the method of improving user security of the satellite-ground integrated network system as mentioned above is implemented.

According to the methods and apparatuses for improving user security of the satellite-ground integrated network systems provided by the embodiments of the present disclosure, on the basis of a satellite-ground integrated network pipeline only authenticates a terminal in a satellite-ground integrated network, the legality of users and services using the terminal is further checked based on CA digital certificates and user characteristic information, which can effectively improve protection level of a data network side terminal against attacks from pseudo users and illegal services, without upgrading the security protection. In addition, the above method and apparatuses provided by the embodiments of the present disclosure effectively improve the 3GPP satellite-ground integration scenario and requirements, and further provide effective technical supplements to the satellite-ground integration security technology architecture proposed by CCSA. The satellite-ground integrated network system may be a 5G network architecture, a 4G network architecture, or a network architecture that integrates 4G and 5G.

The features and advantages of the present disclosure will be explained in detail with embodiments combined with the accompanying drawings.

DETAILED DESCRIPTION

To make the purpose, technical solution and advantages of the present disclosure clearer, the present disclosure will be described below in detail with reference to accompanying drawings and specific embodiments. However, it should be understood that the described embodiments herein are only used to explain the present disclosure rather than limit the present disclosure.

The present disclosure proposes a user security improvement method for a satellite-ground integrated network system, which utilizes digital certificates issued by a certificate authority (CA) for data plane (or control plane) devices of a satellite-ground integrated core network and users, and user characteristic information carried in a control plane (CP) or user plane (UP) message, to perform checking on a network element (NE) of the satellite-ground integrated network user plane or control plane. How the CA generates the digital certificates can use any process familiar to those skilled in the art, so it is not to be repeated herein. In addition, the satellite-ground integrated network system may be a 5G network architecture, a 4G network architecture, or a network architecture that integrates 4G and 5G. The following will take the 5G network architecture as an example to elaborate on the concept and implementation details of the present disclosure. Based on the reading and understanding of the following text, those skilled in the art can obtain the implementation of the technical solution of the present disclosure under the 4G network architecture and the network architecture that integrates 4G and 5G without any creative effort, so it will not be repeated herein.

Figure 1:
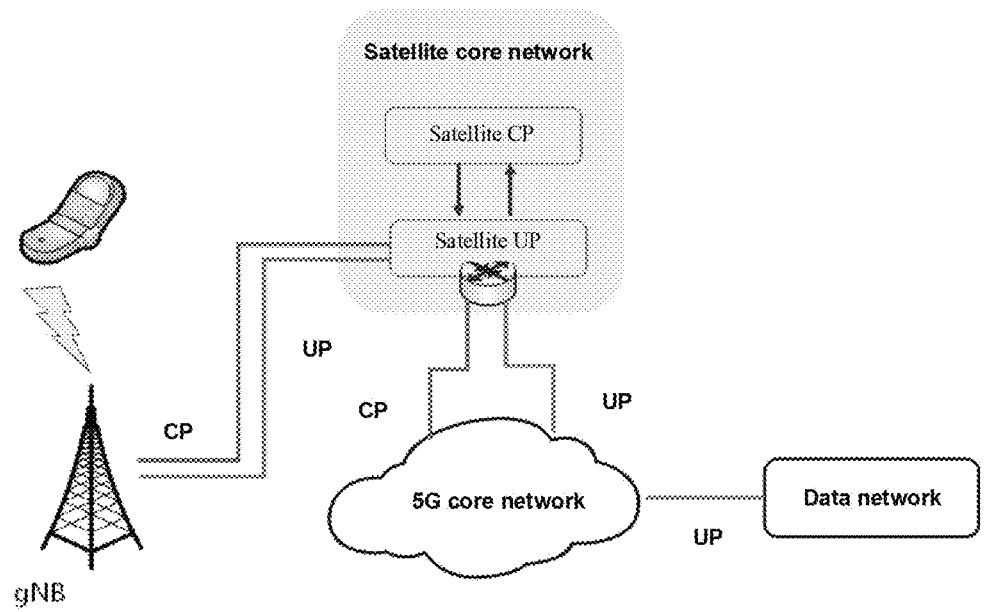
FIG. 1 is a schematic diagram of a 5G space-ground integrated network architecture in existing art.
Figure 2:
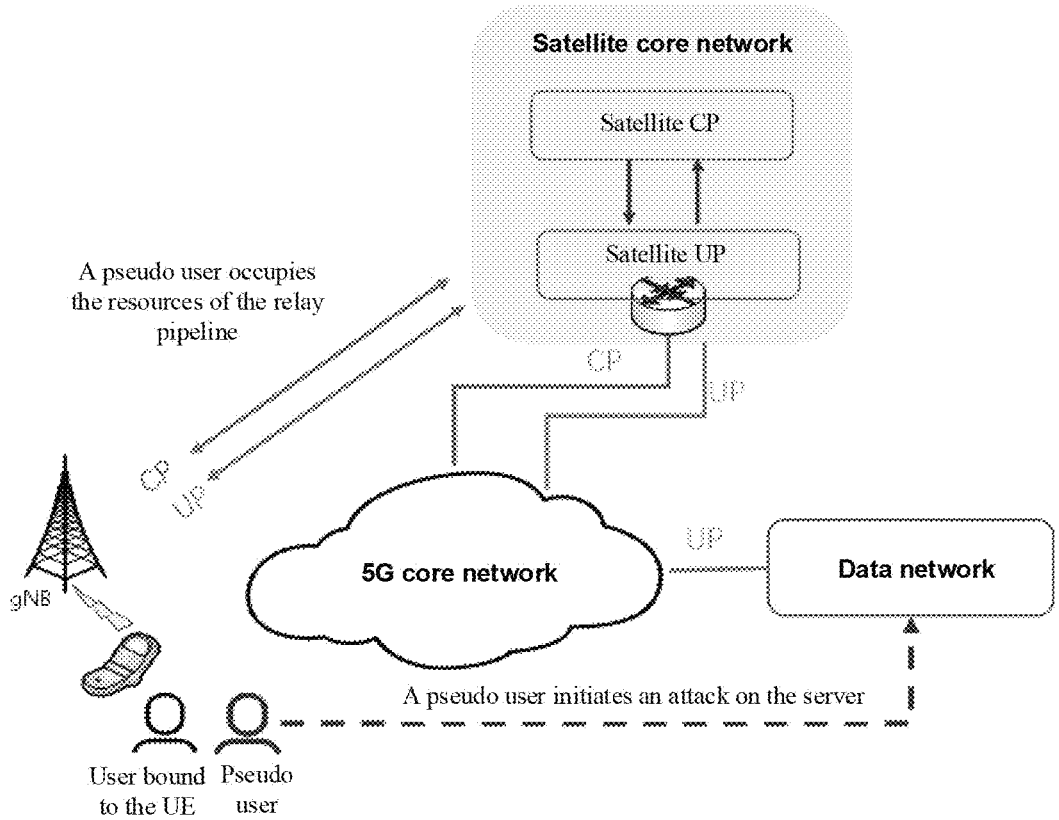
FIG. 2 is a schematic diagram of user security protection of a 5G space-ground integrated network architecture in existing art.
Figure 3:
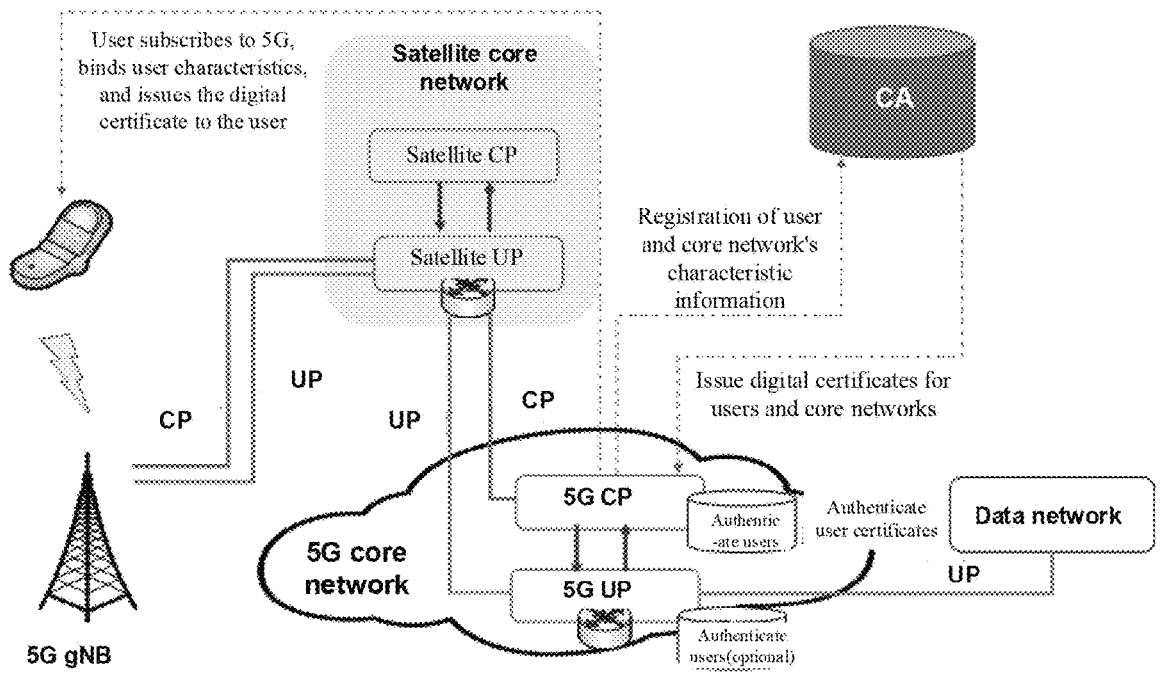
FIG. 3 is a schematic diagram of a 5G space-ground integrated network architecture in the present disclosure.

As shown in FIG. 3, the digital certificate issued by the CA to a user needs to be bound to characteristic information (such as user habits, spatio-temporal information, etc.,) of the user. The characteristic information is registered to the CA by a 5G operator after signing services with a terminal user, the CA generates a digital certificate after binding the characteristic information registered by the user and returns the digital certificate to the 5G operator, and then the operator issues the digital certificate to the subscribed user.

The authentication of a 5G terminal in the present disclosure relies on an existing registration process of the 5G core network. The function of performing verification on the digital certificate and user characteristics for a user of a 5G terminal that has successfully passes the 5G registration process may be deployed in the 5G core network, and includes a total of two verifications: digital certificate/digital signature verification and user characteristic information verification. In particular, if the verification is successful, the user's service-related messages/data flow can pass through a data pipeline constructed by a satellite and 5G together, otherwise the user's connection to a data network side will be interrupted. The verification function can be divided into the following two deployment scenarios.

According to an embodiment of the present disclosure, a digital certificate verification function for the user using the 5G terminal may be deployed on a user plane function (UPF) network element of the 5G core network. Verification rules, flow detection rules, and reporting rules for the verification function can be issued via a session management function (SMF) network element. After detecting a start of a service flow of a corresponding user, the UP performs traffic gating on the service flow according to packet detection information and user legitimacy verification information.

According to another embodiment of the present disclosure, verification of the digital certificate and user characteristics for the user of the 5G terminal may be deployed on the SMF or authentication management function (AMF) network element of the 5G core network. Compared with the solution of deploying verification function on the UP, deploying the verification function on the CP can further verify the user's CP messages, so that not only the user's service flow can be gated, but also the relevant CP signalling used for service pipeline establishment, modification, and deletion can be designed for gating. In particular, in the present disclosure, the user plane may also be referred to as a service plane.

Figure 4:
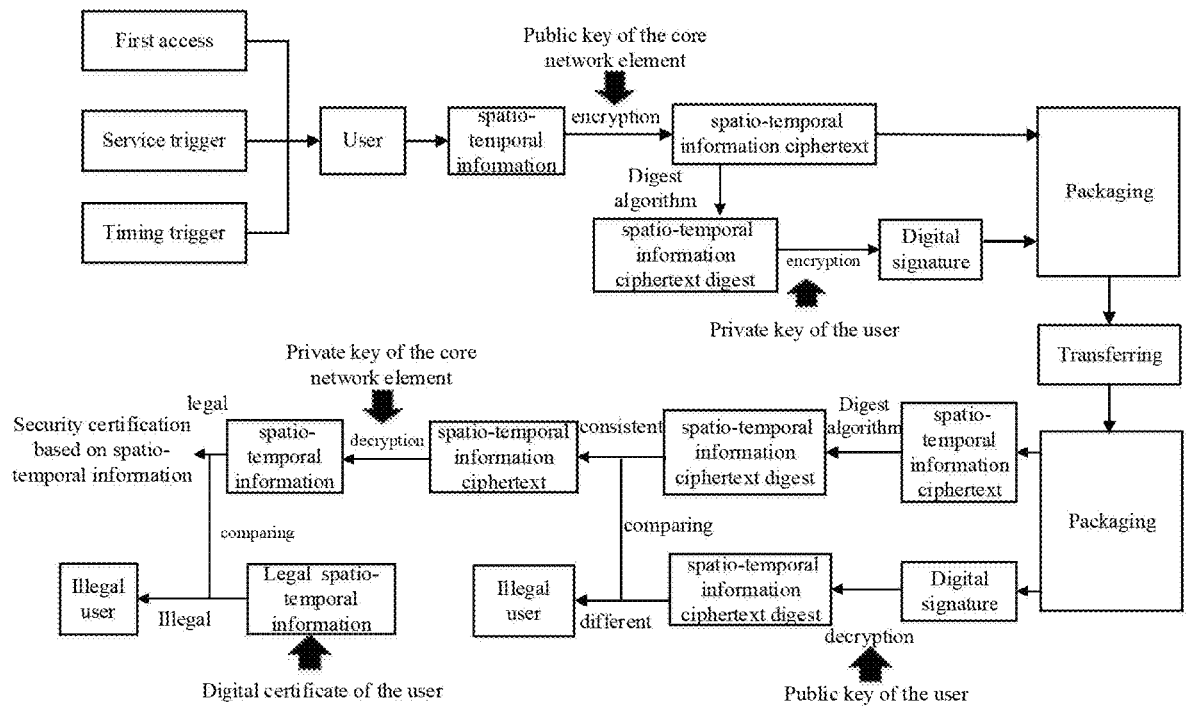
FIG. 4 is a flowchart of a method of improving user security for a 5G system according to an embodiment of the present disclosure.

As shown in FIG. 4, according to an embodiment of the present disclosure, a 5G network pipeline (CP or UP NE) is proposed. On the basis of authenticating a 5G terminal (e.g., on the basis of the existing registration process), an additional verification process for user security of the 5G terminal is added, including two parts: verification of user identity legality and verification of user spatio-temporal characteristic legality (geographical location, service initiation time, etc.). Also, as shown in FIG. 4, the verification process can be triggered under the following three conditions.

Condition A: A user currently using the terminal initiates a service for the first time.

Condition B: A specific service for a user, which needs to trigger an authentication process for user's identity and user's characteristic information, the specific service can generally refer to services that comply with packet detection rules (PDRs) issued by the CP and detection and reporting conditions configured to the UP to detect a specific user's service flow, such as comply with a user's IP address, an application identifier of QoS flow identifier (QFI) service, etc.

Condition C: Timing trigger is realized by a configured timer, and time granularity of the timer is adjustable. The timer can be set by the CP and configured to the UP, and a specific time granularity can be year, month, day, hour, minute, second, etc. For example, by setting a bit "PERIO=1" and setting an information element "Measurement Period=10" in an associated trigger of the reporting in the existing TS 29.244, the verification process is triggered every 10 seconds.

A public key of a core network element (AMF, SMF or UPF) used for the above user legitimacy verification process is obtained through CA issuance. When the user initiates a service, a user's spatio-temporal information ciphertext is formed by encrypting contents of spatio-temporal information characteristic through the core network public key in the digital certificate issued by the CA. The spatio-temporal information ciphertext is then processed through a digest algorithm to form a spatio-temporal information ciphertext digest, and a user's private key is used to encrypt the spatio-temporal information ciphertext digest to form a user's digital signature. Then, the user packages the digital signature and the spatio-temporal information ciphertext into a packet header or a packet payload of a 5G CP or UP message and sends the message to the 5G core network.

When a 5G core network element performs the user legitimacy verification process for the user's CP and/or UP messages according to any of the above three triggering conditions, the 5G core network element can separately process the spatio-temporal information ciphertext and digital signature encapsulated by the user, including: processing the spatio-temporal information ciphertext through the digest algorithm to form a spatio-temporal information ciphertext digest; decrypting the digital signature using a user's public key (the user's public key is included in the digital certificate issued by the CA) to form a spatio-temporal information ciphertext digest; and comparing the above two spatio-temporal information ciphertext digests.

If the above two types of spatio-temporal information ciphertext digests are consistent, the core network element deems that the user is legal, and the core network element may further verify the user's spatio-temporal characteristic information legality. Verifying the user's spatio-temporal characteristic information legality may specifically include: decrypting the user's spatio-temporal information ciphertext through the private key of the core network element itself, and verifying user's spatio-temporal information obtained by the decryption.

If the above two types of spatio-temporal information ciphertext digests are different, the core network element deems that the user is illegal, and intercepts the user and the service.

Furthermore, the 5G core network element verifies the user's spatio-temporal information obtained by the decryption, which may specifically include: if the user's spatio-temporal information obtained by the decryption is consistent with the user's spatio-temporal information stored in the digital certificate obtained from the CA, it is deemed that the user is legal, and spatio-temporal information that initiated the service conforms to the current user's usage characteristics, so that the verification is passed and the service pipeline is opened; or if the user's spatio-temporal information obtained by the decryption is different from the user's spatio-temporal information stored in the digital certificate obtained from the CA, it is deemed that although the user's identity is legal, the spatio-temporal information initiated the service does not conform the user's usage characteristics, so that the verification is failed and the service pipeline is closed.

EMBODIMENTS

Step 1: a roaming service of a 5G satellite pipeline is subscribed by a user, and characteristic information of the user is also subscribed. The characteristic information of the user includes but is not limited to: spatio-temporal characteristics, such as usage time, location, speed, tracking area information (TAI), base station access angle, specific base station, etc.; service characteristics, such as traffic, service server name, server address, usage habits, etc.; and network element slice support information (e.g., SnssaiSmfInfoItem), such as network element feature information of a 5G core network (a network element service area, etc.)

Step 2: after obtaining the characteristic information subscribed by the user, the 5G core network directly or indirectly sends the user's characteristic information to a CA via a service interface with the CA.

Step 3: after obtaining the user's characteristic information, the CA adds the characteristic information into the user's basic information of a digital certificate and issues the digital certificate for the user. The digital certificate can be sent directly or indirectly to a 5G core network element via a service interface with the 5G core network element.

Step 4: after obtaining the digital certificate, the 5G core network element issues the digital certificate to a user end of a 5G terminal. An issuance form may be in a form of software, hardware (similar to a U-key of a bank), a login password, etc. In particular, the digital certificate cannot be saved in a form of temporary files (e.g., cookies) on the terminal, so as to avoid being used in subsequent user authentication processes triggered by a network or a user.

Step 5: the 5G core network authenticates the 5G terminal, following an existing 5G registration process.

Step 6: when the user initiates a service using a terminal successfully registered to a 5G system, a user's CP or UP message needs to carry information such as digital certificate/digital signature/public key containing the user's characteristic information. After receiving a service request initiated by the user using the 5G terminal, the 5G core network element verifies user's legitimacy of the service in the CP and the UP.

The step 6 may include the following substeps.

Step 6.1: the 5G core network element verifies the user's legitimacy of the service in the CP and the UP can be triggered under the following conditions; A, the current service request is initiated for the first time by the user using the terminal; B, the current service request relates to a specific service for the user, the specific service for the user is to trigger an authentication process for user's identity and user's characteristic information; or C, the user legitimacy verification is triggered by a configured timer, and time granularity of the timer is adjustable.

Step 6.2: a public key of a core network element (AMF, SMF or UPF) used for the user legitimacy verification process is obtained through the CA issuance. When the user initiates the service, a user's spatio-temporal information ciphertext is obtained by encrypting contents of spatio-temporal information characteristic with the core network public key in the digital certificate issued by the CA. The spatio-temporal information ciphertext is then processed through a digest algorithm (such as a MD5 Message-Digest Algorithm) to form a spatio-temporal information ciphertext digest, and a user's private key is used to encrypt the digest to obtain a user's digital signature. The digital signature and the spatio-temporal information ciphertext are packaged into a packet header or a payload of a 5G CP or UP message, and then the message is sent to the 5G core network.

Step 6.3: when determining to trigger the verification for the user using the terminal and service at step 6.1, the 5G core network element verifies the user's legitimacy for the user's CP and/or UP message, including processing the spatio-temporal information ciphertext and the digital signature encapsulated by the user as follows: a) for the spatio-temporal information ciphertext, a digest algorithm is used to form a spatio-temporal information ciphertext digest; and b) for the digital signature, it is decrypted by using a user's public key (the user's public key is included in the digital certificate issued by the CA) to form a spatio-temporal information ciphertext digest.

Step 7: the 5G core network element compares the above two spatio-temporal information ciphertext digests.

Specifically, if the above two spatio-temporal information ciphertext digests are consistent, the user is deemed legal, and the core network element performs further verification for the legitimacy of the user's spatio-temporal characteristic information. If there is any difference between the above two spatio-temporal information ciphertext digests, the user is deemed illegal, and the core network element intercepts the user and the service.

When the spatio-temporal information ciphertext digests are consistent, the 5G core network element decrypts the user's spatio-temporal information ciphertext using the private key of the core network element itself, and verifies the user's spatio-temporal information obtained by decryption. Specifically, if the user's spatio-temporal information obtained by the decryption is consistent with the user's spatio-temporal information kept in the digital certificate obtained from the CA, it is determined that the user is legal, and spatio-temporal information that initiated the service conforms to the current user's usage characteristics, so that the verification is passed and the service pipeline is opened; if the user's spatio-temporal information obtained by the decryption is different from the user's spatio-temporal information stored in the digital certificate obtained from the CA, it is deemed that although the user's identity is legal, the spatio-temporal information initiated the service does not conform the user's usage characteristics, so that the verification is failed and the service pipeline is closed.

For messages carrying digital certificates/digital signatures of associated users or user-related service flows, the detection and verification modes adopted by the UP and CP are configurable. It can be deployed in advance through pre-configuration or configured in real time based on network status.

On the basis of the satellite-ground integrated network only provides terminal authentication, the present disclosure adds a method for verifying legitimacy of a terminal user, which is implemented by deploying verification function for user characteristic information and digital certificate/digital signature on the data plane (or CP) of the satellite-ground integrated core network. This method can effectively reduce the possibility of illegal users initiating services that occupies network pipeline resources and attacks the server side without changing the security protection of the data network side (server side).

The present disclosure provides an embodiment of a user security enhancement apparatus for a satellite-ground integrated network system, which can be applied to any device with data processing capabilities, such as a computer or other apparatus. The apparatus embodiment can be implemented by software, or by hardware, or a combination of software and hardware. Taking software embodiment as an example, as an apparatus in a logical sense, it is formed by reading corresponding computer program instructions in a non-volatile memory into a memory and running them through a processor of any device with data processing capabilities.

Figure 5:
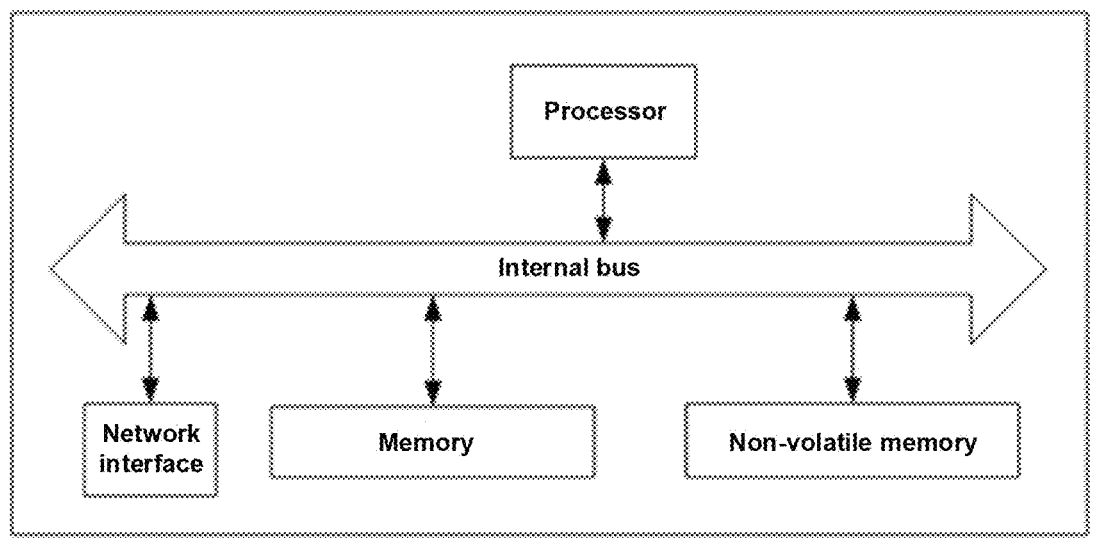
FIG. 5 is a structure diagram of an apparatus for improving user security for a 5G system according to an embodiment of the present disclosure.

In terms of hardware, as shown in FIG. 5, it is a hardware structure diagram of any device with data processing capabilities located in a user security improvement apparatus for a satellite-ground integrated network system in the present disclosure, in addition to a processor, a memory, a network interface, and a non-volatile memory, any device with data processing capabilities where the apparatus in the embodiment is located may further include other hardware according to actual function of the device with data processing capabilities, and will not be repeated here. For details about the implementation process of the functions and effects of each unit in the above apparatus, reference can be made to the implementation process of the corresponding steps in the above method, and will not be repeated here.

For the embodiments of the apparatus, since they basically correspond to the embodiments of the method, they may be referred to the partial description of the embodiments of the method. The embodiments of the apparatus are merely illustrative, where units described as separate components may or may not be physically separated, and components displayed as units may or may not be physical units, i.e., may be located a same location, or it may be distributed to multiple network units. Some or all of these modules can be selected according to actual needs to achieve the purpose of the solution in the present disclosure. Those of ordinary skill in the art can understand and implement the present disclosure without any creative effort.

Embodiments of the present disclosure further provides a computer-readable storage medium on which a program is stored, when the computer program is executed by a processor, the method for improving user security of the satellite-ground integrated network system in the aforementioned embodiment is implemented.

The computer-readable storage medium can be an internal storage unit of any device with data processing capabilities, such as a hard disk or a memory, as described in any of the aforementioned embodiments. The computer-readable storage medium may also be an external storage device of any device with data processing capabilities, such as pluggable hard disks, smart memory cards (SMC), SD cards, Flash Card, etc. equipped on the device. Further, the computer-readable storage medium may further include both an internal storage unit and an external storage device of any device with data processing capabilities. The computer-readable storage medium is configured to store the computer program and other programs and data required by any device with data processing capabilities, and may further be configured to temporarily store data that has been output or will be output.

The above are only preferred embodiments of the present disclosure, which are not intended to limit the present disclosure. Any modification, equivalent substitution, or improvement made within the spirit and principle of the present disclosure shall be included within the protection scope of the present disclosure.

The invention claimed is:

1. A method of improving user security of a satellite-ground integrated network system, comprising:
    bonding, by a user and a satellite-ground integrated core network, own characteristic information to a certificate authority (CA) respectively, to obtain digital certificates, wherein the characteristic information comprises one or more spatio-temporal characteristics and one or more service characteristics of the user;
    initiating, by the user through a terminal of a satellite-ground integrated network system, a service request to the satellite-ground integrated core network;
    determining, by the satellite-ground integrated core network, whether to trigger a legitimacy verification for the user after receiving the service request;
    in a case of determining not to trigger the legitimacy verification for the user, directly releasing, by the satellite-ground integrated core network, a service flow of the user; and
    in a case of determining to trigger the legitimacy verification for the user,
        calculating, by the satellite-ground integrated core network, spatio-temporal information ciphertext in the received service request through a digest algorithm to obtain a first spatio-temporal information ciphertext digest;
        decrypting, by the satellite-ground integrated core network, a digital signature in the received service request using a public key of the user to obtain a second spatio-temporal information ciphertext digest;
        comparing, by the satellite-ground integrated core network, the first spatio-temporal information ciphertext digest with the second spatio-temporal information ciphertext digest;
        in response to determining that the first spatio-temporal information ciphertext digest is consistent with the second spatio-temporal information ciphertext digest, determining, by the satellite-ground integrated core network, the user being legal, and
        decrypting the spatio-temporal information ciphertext using a private key of the satellite-ground integrated core network to obtain spatio-temporal information characteristics;
    verifying the obtained spatio-temporal information characteristics;
    in response to determining that the verification is passed, opening a service pipeline for the user; and
    in response to determining that the verification fails, closing the service pipeline for the user; and
    in response to determining that the first spatio-temporal information ciphertext digest is not consistent with the second spatio-temporal information ciphertext digest, determining, by the satellite-ground integrated core network, the user being illegal, and intercepting the user and a service.

2. The method according to claim 1, wherein bonding, by the user and the satellite-ground integrated core network, own characteristic information to the CA respectively comprising:

subscribing, by the user, with the satellite-ground integrated core network, and meanwhile subscribing the characteristic information of the user;

sending, by the satellite-ground integrated core network, the characteristic information of the user and characteristic information of a network element deployed with verification function together to the CA;

generating, by the CA, a public key and a private key for the user and a public key and a private key for the satellite-ground integrated core network, adding the characteristic information of the user and the satellite-ground integrated core network into the corresponding digital certificates, and returning the digital certificates to the satellite-ground integrated core network;

issuing, by the satellite-ground integrated core network, the digital certificate belonging to the user to the user; and loading, by the network element of the satellite-ground integrated core network deployed with the verification function for the user's characteristic information, the digital certificate corresponding to the core network element.

3. The method according to claim 1, wherein initiating, by the user through the terminal of the satellite-ground integrated network system, the service request to the satellite-ground integrated core network comprising:

encrypting, by the user, the spatio-temporal information characteristics using a public key of the satellite-ground integrated core network in the digital certificate to obtain the spatio-temporal information ciphertext;

calculating, by the user, the spatio-temporal information ciphertext through the digest algorithm to obtain a spatio-temporal information ciphertext digest;

encrypting, by the user, the spatio-temporal information ciphertext digest using a private key of the user to obtain the digital signature;

packaging, by the user, the digital signature and the spatio-temporal information ciphertext into the service request, and sending the service request to the satellite-ground integrated core network.

4. The method according to claim 1, wherein the spatio-temporal characteristics comprise any one or more of: usage time, a location, speed, tracking area information, a base station access angle, and a specific base station.

5. The method according to claim 1, wherein the service characteristics comprise any one or more of: traffic, a service server name, a server address, usage habit characteristics, quality of service, a service duration, a service message type, and a service load type.

6. The method according to claim 1, wherein a condition for determining to trigger the legitimacy verification for the user is the received service request is a first service initiation by the user currently using the terminal of the satellite-ground integrated network system.

7. The method according to claim 1, wherein a condition for determining to trigger the legitimacy verification for the user is the received service request is a specific service of the user, and the specific service is to trigger an authentication process for identity and the characteristic information of the user.

8. The method according to claim 1, wherein a condition for determining to trigger the legitimacy verification for the user is timing triggered by a configured timer.

9. The method according to claim 1, wherein verifying the obtained spatio-temporal information characteristics comprising:

in response to determining that the obtained spatio-temporal information characteristics are consistent with the spatio-temporal information characteristics in the digital certificate, determining that the verification is passed; or in response to determining that the obtained spatio-temporal information characteristics are not consistent with the spatio-temporal information characteristics in the digital certificate, determining that the verification is failed.

10. The method according to claim 1, wherein the satellite-ground integrated network system is any one of:

a 4G network architecture;

a 5G network architecture; or a network architecture that integrates 4G and 5G.

11. An apparatus for improving user security of a satellite-ground integrated network system, comprising a memory and one or more processors, wherein the memory is stored with executable code, when the one or more processors executes the executable code, the method according to claim 1 is implemented.

12. A non-transitory computer-readable storage medium, storing a computer program, which, when executed by a processor, the method of improving user security of the satellite-ground integrated network system according to claim 1 is implemented.

* * * * *